United States Patent Office 3,573,917
Patented Apr. 6, 1971

3,573,917
LIGHT-SENSITIVE PRINTING PLATE
COMPOSITION
Takashi Okamoto, 6–4 Chuoo 2-chome, Warabi,
Saitama Prefecture, Japan
No Drawing. Filed July 12, 1968, Ser. No. 744,298
Int. Cl. G03c 1/60, 1/54
U.S. Cl. 96—75    2 Claims

ABSTRACT OF THE DISCLOSURE

Photo process sensitive layer comprising a resin obtained by heating a resin of the cresol novolak type and an organic phosphate containing at least one benzene nucleus under acidic conditions and a sensitive agent represented by the following general chemical structure

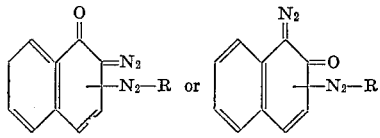

wherein R is an aromatic group having no radical that is capable of producing a water-soluble alkaline salt.

SUMMARY OF THE INVENTION

This invention relates to photo process sensitive layers for printing purposes using an alkaline solution as a developing agent but using no fatty ink or lacquer.

In general, sensitive layers for photo printing purposes consist of mixture of a sensitive agent (diazo-compound) and a resin, and the acid-tightness of its image, its close fixation onto a metal and its hydrophilic properties receptive to ink are all dependent on the resin in use for such a purpose.

There are some resins of the above-mentioned kind which can be used for printing purposes after their denaturation.

For example, there are various methods of using copolymers of vinyl resin, mixtures of phenol acetate resin, maleate resin and vinyl resin, and mixtures of phenol resin, castor oil and tung oil.

Moreover, it has already been well known that p-quinone diazide or o-quinone diazide is mixed with vinyl or phenol resin to make a sensitive layer and after developing it, fatty ink as an ink draw-in agent is applied to the sensitive layer to complete a printing plate.

In addition, a sensitizing agent of resin made by the treatment of diazo phenyl amine and formaldehyde is exposed to light, and after developing, it is overlaid with lacquer containing a resin for improving its acid-tightness and oleophilic properties.

In order to make a printing plate without applying fatty ink or lacquer to the image, the sensitive layer itself must be acid-tight and strongly oleophilic.

Thus it is the primary object of the present invention to provide such a sensitive layer, i.e. a photo process sensitive layer consisting of a resin produced by heating cresol novolak resin and an organic phosphate containing at least one benzene nucleus under acidic conditions and a sensitizing agent represented by the following general chemical structure,

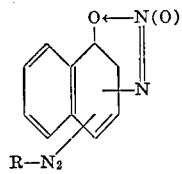

wherein R is an aromatic radical having no radical that can produce a water-soluble alkaline salt.

The second object of the invention is to provide a sensitive layer obtained by forming on a metal plate a coating consisting of the mixture of cresol novolak resin, an organic phosphate having at least one benzene nucleus and a sensitizing agent represented by the following general chemical structure,

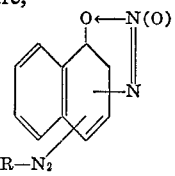

wherein R is an aromatic radical having no radical that can produce a water-soluble alkaline salt by heating said coating under acidic conditions.

DETAILED DESCRIPTION OF THE INVENTION

In order to prepare the above-mentioned resin for use as a sensitive layer according to the present invention, first of all, cresol is reacted with formaldehyde or p-formaldehyde to obtain an acidic condensation product called novolak resin in general terms.

This procedure is so commonly known that an explanation thereof is omitted here.

Then, the above-mentioned condensation product called novolak resin is mixed with an organic phosphate containing at least one benzene nucleus and the resulting mixture with the incorporation of an acid to make said mixture weak acidic is subjected to heating in order to obtain a sensitive layer according to the present invention.

As examples of organic phosphates containing at least one benzene nucleus for use by the present invention, there are tricresyl phosphate, triphenyl phosphate, diphenyl phosphine, diphenylcresyl phosphate and dipenyl monoxoxenyl phosphate.

Thus one of these organic phosphates and novolak resin are heated under acidic conditions. In this manner, it is conceivable that there occurs an association between them or a complex body therefrom though such reaction is not yet confirmed.

The reason for this kind of presumption will be understood as follows. Namely, when merely mixing one of the above-mentioned organic phosphates or some plasticizer other than these with novolak resin without heating under weak acidic conditions, the nature of the resultant product will be found quite different from what is obtained as specified by the present invention, and no satisfactory images can be obtained on developing the former product in an alkaline developing solution. In the case of the present invention, an organic phosphate, 0.3–50% (by weight), preferably 10–20% is added to novolak resin, and the resulting mixture is heated to over 100° C. or preferably over 230° C. and after stirring it for 10–20 minutes it is cooled for practical use. In this case, the acid for use to make said mixture acidic may be some inorganic acid such a hydrochloric acid or phosphoric acid or some organic acid such as citric acid, acetic acid or oxalic acid, but such acid is desirable as may not react with novolak and phosphoric acid. Instead of heating the above-mentioned organic phosphate and novolak resin under weak acidic conditions, it is also possible that after a sensitive layer has been composed of said sensitizing agent, organic phosphate and novolak resin, it may be subjected to heating.

But the sensitizing agent for use in this case must be stable against heating.

When the sensitizing agent (diazo-compound) is weakly acidic, it is not necessary to incorporate a strong acid at the time of heating said mixture.

On the other hand, in the case of producing a novolak resin, an acid is used as an acidic catalyst, however it is not always necessary to incorporate an acid when some part of said catalyst remains.

When using the resin specified by the present invention for the manufacture of a sensitive layer, a sensitive material will be incorporated as represented by the following general chemical structure,

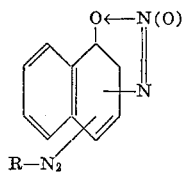

wherein R is an aromatic radical, e.g. a benzene nucleus, naphthaline nucleus and diphenyl radical to which an alkyl or halogen radical may be bonded, provided that said aromatic radical must not contain any radical which can produce a water-soluble alkali salt, e.g. a sulfonic or carboxylic radical, and the indication (O) show O or $N_2$ in the position of ortho, namely

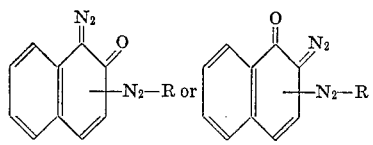

In order to produce the above-mentioned sensitive material, the following procedures are available.

The first-procedure consists in reacting such chemical compound as 1-amino 2-naphthol 4-sulfonic acid, 2-amino-1-naphthol 4-sulfonic acid, 1-amino-2-naphthol, and 2-amino-1-naphthol with a diazonium compound by coupling to make the former insoluble in water and converting it to a naphthoquinone compound in an organic solvent.

The second procedure consists in reacting such chemical compound as 2-naphthylamine 1-sulfonic acid or 1-naphthylamine 2-sulfonic acid with a diazonium compound by coupling, then diazotizing this reacted material with sodium nitrite and sulphuric acid and oxidizing it with a chlorine solution or hydrogen peroxide, thereby obtaining a naphthoquinone compound.

For the purpose of forming a sensitive layer by the use of the above-mentioned resin and sensitive material, the following operation is recommended.

Firstly, the above-mentioned product of resin is dissolved in a solvent such as methanol, ethanol acetone, methyl cellosolve, ethyl cellosolve, butyl cellosolve, N, N'-dimethyl formaldehyde and 2-nitropropane. The above-mentioned sensitive material is added to said resin in the ratio of about 2:1 to 50:1 or preferably 8:1 to 12:1.

The sensitive layer thus obtained, after developing, can produce a strongly and closely adhering image of excellent contrast, which will be found as an image of superior oleophilic properties without using fatty ink or lacquer.

An alkaline material as developing agent for use may be caustic soda, trisodium phosphate, disodium phosphate, sodium carbonate, sodium silicate, o-sodium silicate singly or a mixture of more than two of them in the form of a 5–10% solution thereof.

In order to make the image of said sensitive layer after exposure, a dyestuff or the like may also be incorporated in the sensitizing solution. A few embodiments of the invention will be explained in concrete detail hereinafter.

EXAMPLE 1

The surface of an aluminum plate with saw setting was uniformly coated with the following solution by means of a rotary machine.

Namely, tricresol phosphate, 50 cc. and oxalic acid, 2 g. were added to cresol formaldehyde resin, 100 g. and the resulting mixture was heated at 180–200° C. and subjected to eutectic melting for 10 minutes. After cooling, 7 g. of the resin thus obtained and 2 g. of a sensitizing agent obtained by the method described hereinafter were dissolved in ethyl cellosolve, 100 cc. to produce the aforecited solution which was used to coat said aluminum plate.

Said sensitizing agent was obtained by the following operation. Namely, 4-aminodiphenylamine, 20 g. was suspended in a mixture of hydrochloric acid, 20 cc. and water, 100 cc.

The aqueous solution of sodium nitrite, 6.9 g. drop by drop, was added to said suspension after cooling.

The reacted solution was filtered and the filtrate was added to a weak acidic aqueous solution of 1-amino 2-napthol 4-sulfonic acid, 23.9 g. Then the resulting solution was filtered and after drying, the filtrate was dissolved in methyl cellosolve, 300 cc., to which was added hydrochloric acid, 10 cc. and then sodium nitrite 6.9 g. dissolved in a little water, drop by drop, was added to said solution dissolved in methyl Cellosolve. Then 1 or 2 hours later, said resulting solution was poured into water for crystallization.

The aluminum plate thus coated with the sensitizing solution was dried for a short period of time (5–10 minutes), when a sensitive layer could be established on the surface thereof.

Then this sensitive layer was placed under a positive pattern and exposed to an arc light source of 30 A. at a distance of about 50 cm. for about 2 minutes and a half.

After this exposure, it was developed in a mixed solution of 5% trisodium phosphate and 0.4% caustic soda.

The positive plate thus obtained is available for printing plates and printing purposes without applying fatty ink but only with the application of gum Arabic.

Really, according to experiments, there occurred no change in ink adhesion to said positive plate after 10 days.

At the same time, in this case when an organic phosphate was not incorporated in the sensitive layer, excessive heating effect led to making its contrast unfavourable and moreover, gum Arabic applied thereto, after 10 days, became tacky on its image so that it could not be removed any more and ink adhesion became impossible.

Moreover, in the case of omitting the heating procedure for producing said resin, it was found that ink adhesion and contrast became unfavourable when developing the image of said sensitive layer. When excess heating was used a satisfactory image was not obtained.

EXAMPLE 2

Cresol formaldehyde resin, 7 g., diphenylcresyl phosphate, 3 cc. and 2 g. of a sensitizing agent obtained by the following method were dissolved in ethyl cellosolve, 100 cc. Then the resulting solution was applied to the surface of an aluminum plate with saw setting by means of a rotary machine in the same manner as Example 1.

The above-mentioned sensitizing agent was produced as follows. Namely, hydrochloric acid, 90 cc. was added to o-toluidine, 54 cc., and then sodium nitrite, 35 g. dissolved in water, was added drop by drop to resulting mixture of hydrochloric acid and o-toluidine.

The reacted solution was added to a weak acidic or neutral aqueous solution of 2-naphthylamine 1-sulfonic acid.

Then the reacted solution was filtered, and after drying, 34.1 g. of the dried product was suspended in water, 500 cc., to which was added a solution composed of sodium nitrite, 7 g. dissolved in water, 20 cc. Then sulphuric acid, 30 g. was added to it drop by drop. After 1 hour, the resulting solution was added to a mixture of 20% sodium carbonate, 200 g. and 30% hydrogen peroxide, 21 g. After 1 or 2 hours, the product thus obtained was filtered out and dried for practical use.

The aluminum plate coated with a layer of the above-produced sensitizing agent was kept at about 80–120° C. for more than 10 minutes and on drying for a while it was formed into the desired sensitive layer.

This sensitive layer was placed under a positive pattern for exposure to a light source.

After exposure, it was developed in a mixture of 5% trisodium phosphate and 0.4% caustic soda.

The positive image thus obtained was found to be an excellent image with good ink adhesion, requiring no fatty ink. In this case, when it was not heated sufficiently, it was difficult to dry, with the result that surface of the layer became tacky and its image became depressive and liable to flow out on developing.

EXAMPLE 3

Triphenyl phosphate, 40 g. was added to cresol formaldehyde resin, 100 g. to which was added oxalic acid, 2 g. and the resulting mixture was heated to 200–230° C. for 10 minutes for eutectic melting together and then cooled to produce the desired resin of the invention.

7 g. of this resin and 2 g. of a sensitizing agent obtained by the following method were dissolved in methyl cellosolve, 100 cc. and the sensitizing solution thus prepared as a coating solution was applied to the surface of an aluminum plate with saw setting.

The above-mentioned sensitizing agent was obtained by the same method as shown in Example 1, namely naphthylamine, 14.3 g. was suspended in hydrochloric acid, 20 cc. and water, 100 cc.

Then an aqueous solution of sodium nitrite 6.9 g. dissolved in water, was added to said suspension drop by drop to produce a diazonium salt. This diazonium salt was added to a weak acidic aqueous solution of 1-amino-2-naphthol 4-sulfonic acid, 23.9 g. for their reaction by coupling. After drying, the product thus obtained was dissolved in acetone, 200 cc. to which were added hydrochloric acid, 10 cc. and a solution of nitrite sodium dissolved in water drop by drop.

After 1–2 hours of its standstill, it was poured into water for crystallization.

The plate coated with this sensitizing agent was dried for a little while (5–10 minutes) and the layer thus formed was exposed to light under a positive pattern in the same condition as Example 1.

After exposure to light in this manner, it was developed in 5% trisodium phosphate and 0.3% caustic soda.

The surface of the positive plate gave an image with excellent ink adhesion requiring no fatty ink.

EXAMPLE 4

Cresol formaldehyde resin, 7 g., tricresyl phosphate, 4 cc. and a sensitizing agent, 2 g. obtained by the following manufacturing method were dissolved in ethyl cellosolve, 80 cc. and N,N'-dimethyl formaldehyde, 20 cc. and the resulting solution was applied to an aluminum plate, with saw setting by means of a rotary machine in the same manner as Example 1.

This sensitizing agent was produced by the same method as shown in Example 2. Namely, hydrochloric acid, 90 cc. was added to p-chloraniline, 64 g. to which, after cooling, was added sodium nitrite, 35 g. dissolved in water drop by drop. The reacted solution was added to a weak acidic or neutral aqueous solution of 2-naphthylamine 1-sulfonic acid.

The reacted product thus obtained was filtered, and after drying, 34.6 g. of this product was suspended in water, 500 cc., to which was added a solution of sodium nitrite, 7 g. dissolved in water. Subsequently, sulphuric acid, 30 g. was added to it by drop application and after 1 hour, the resulting mixture was added to a mixed solution of 20% sodium carbonate, 170 g. and 15% chlorine solution, 145 g. After 1 or 2 hours, it was filtered and dried for practical use.

The aluminum plate coated with this sensitizing agent was heated at about 100° C. for 10 minutes so that it was dried up as a sensitizing layer as specified by the invention. Then, this sensitizing layer was placed under a positive pattern and exposed to light under the same conditions as Example 1. After exposure, it was developed in a mixed solution of 5% trisodium phosphate and 0.6% caustic soda.

The surface of the positive plate thus obtained gave a good image with excellent ink adhesion requiring no fatty ink.

In this case, when it was not dried by heating after adding tricresyl phosphate in a manner similar to Example 2, the surface of the plate became tacky and its image depressive or poor in strength.

What is claimed is:

1. A light-sensitive positive-working printing plate composition comprising a cresol-formaldehyde resin, a benzene substituted phosphate compound, and a light-sensitive naphthoquinone diazide compound having one of the following general chemical structure,

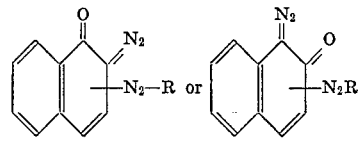

wherein R is an aromatic radical, said radical not having substitution that can produce a water-soluble alkaline salt, said composition having an acidic pH.

2. A light-sensitive article to be used as a positive-working printing plate, comprising a metal plate having a coating thereon, said coating comprising the composition of claim 1.

References Cited

UNITED STATES PATENTS

| | | | |
|---|---|---|---|
| 3,126,281 | 3/1964 | Sus et al. | 96—75 |
| 3,219,447 | 11/1965 | Neugebauer et al. | 96—33 |
| 3,269,837 | 8/1966 | Sus | 96—91X |
| 3,288,608 | 11/1966 | Coutaud et al. | 96—91 |
| 3,373,021 | 3/1968 | Adams et al. | 96—75X |
| 3,404,003 | 10/1968 | Steppan | 96—33 |

FOREIGN PATENTS

| | | | |
|---|---|---|---|
| 706,879 | 4/1954 | Great Britain | 96—91D |
| 819,667 | 9/1959 | Great Britain | 96—91D |

NORMAN G. TORCHIN, Primary Examiner

C. L. BOWERS, Jr., Assistant Examiner

U.S. Cl. X.R.

96—33, 91; 260—141